United States Patent [19]

Gersch

[11] 4,251,760
[45] Feb. 17, 1981

[54] GAUGING AND TOOL CONTROL SYSTEM FOR PRODUCTION OF IDENTICAL PARTS

[75] Inventor: Richard C. Gersch, Traverse City, Mich.

[73] Assignee: Subco, Inc., Traverse City, Mich.

[21] Appl. No.: 920,707

[22] Filed: Jun. 30, 1978

[51] Int. Cl.³ .............................................. G05B 19/30
[52] U.S. Cl. ................................... 318/604; 318/657; 318/660; 51/2 AA
[58] Field of Search ............... 318/604, 656, 657, 658, 318/659, 660, 567, 578; 51/2 AA

[56] References Cited

U.S. PATENT DOCUMENTS

| | | | |
|---|---|---|---|
| 1,998,939 | 4/1935 | Mittag | 318/578 |
| 2,116,593 | 5/1938 | Bouvier et al. | 318/578 X |
| 2,673,951 | 3/1954 | Morel | 318/576 X |
| 2,939,287 | 6/1960 | Capron et al. | 318/578 X |
| 2,962,645 | 11/1960 | Rudolf, Jr. et al. | 318/578 X |
| 3,259,819 | 7/1966 | Heiser | 318/578 |
| 3,626,283 | 12/1971 | James et al. | 318/657 |
| 3,684,961 | 8/1972 | Muir | 318/656 X |
| 3,886,562 | 5/1975 | Atzinger | 318/604 |
| 3,939,389 | 2/1976 | Nopper | 318/657 X |

Primary Examiner—B. Dobeck
Attorney, Agent, or Firm—Price, Heneveld, Huizenga & Cooper

[57] ABSTRACT

A system for duplicating a master part includes a gauge for measuring changes in the dimension therein of a master part to be duplicated and for providing control signals representative of changes from a predetermined dimension. The control signals are applied to a control circuit for controlling an adjustable tool block associated with a machine tool for machining a workpiece in response to the control signals from the gauge to assure that the workpiece dimension conforms to that of the master part.

9 Claims, 5 Drawing Figures

GAUGING AND TOOL CONTROL SYSTEM FOR PRODUCTION OF IDENTICAL PARTS

BACKGROUND OF THE INVENTION

The present invention relates to machine tool controls and particularly to a control circuit for permitting duplication of identical parts.

In the machining industry, it is frequently desirable to reproduce an existing part even though the part itself may be out of tolerance from the prescribed engineering drawings. Thus, for example, in the bearing art where the bore of a bearing is, for example, two inches in diameter but the part itself which is used in a system has a tolerance of, for example, ten thousandths of an inch and may, in fact, be out of tolerance or vary within the tolerance, it is frequently desired in order to replace the bearing or to provide a bearing with equal performance standards, to substantially identically manufacture additional bearings from the master part. In the past, this had to be done manually by gauging the bearing bore, recording such information manually, and manually adjusting the machine tool as a new bearing is manufactured to reproduce the original part. Such a process is difficult, time consuming, costly, and prone to machining errors.

The present invention provides an automatic control system for reproduction of master parts without requiring continuous monitoring by an operator and assures that the replacement part (i.e., the workpiece) is substantially identical to the master part.

SUMMARY OF THE INVENTION

The system of the present invention accomplishes its objective by providing a gauge with a transducer providing control signals representative of dimension changes from a reference location. These control signals are applied to a control circuit which compares these signals with signals from a transducer in an adjustable tool block also set to the reference dimension. As a master part is gauged, dimensional changes from the reference location provide control output signals which are employed to actuate an adustable tool block drive motor to adjust the machine for machining a workpiece to correspond to the dimensions of the master part.

The advantages, features, and objects of the present invention can best be understood by referring to the following description thereof, in which:

DETAILED DESCRIPTION OF THE PREFERRED EMBODIMENT

Figure 1:
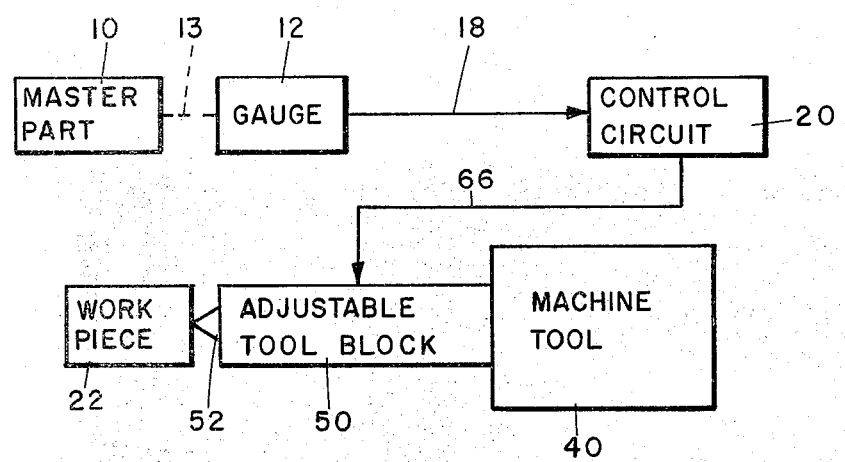
FIG. 1 is a diagram in block form of the present invention.

Referring initially to FIG. 1, there is shown in block diagram form a master part 10 which is mounted in a suitable tool holder and rotated, for example, if the part is a part which is bored or otherwise machined by a rotary process. A gauge 12 is positioned to contact the master part as indicated by coupling 13. Gauge 12 is a commercially available gauge such as Model No. 1821 available from Emtron Controls, Inc., of Oak Park, Mich., and which includes a linear voltage differential transformer (transducer) 14 (FIG. 3) mechanically coupled to the feelers of the gauge by means of a mechanical coupling 15. The transducer is actuated by an AC supply 16 also shown in FG. 3 to provide output signals applied to one input of the control circuit 20 of the present invention by means of a conductor 18.

A workpiece 22 is mounted in a machine 40 such as an Olofsson boring machine to which there is also mounted an adjustable tool block 50 to position a cutting element 52 to perform a boring or turning operation on the workpiece. As noted above, the workpiece may, for example, be a bearing the bore of which is desired to be reproduced substantially of the same dimension as the bore of a master bearing 10.

Figure 2:
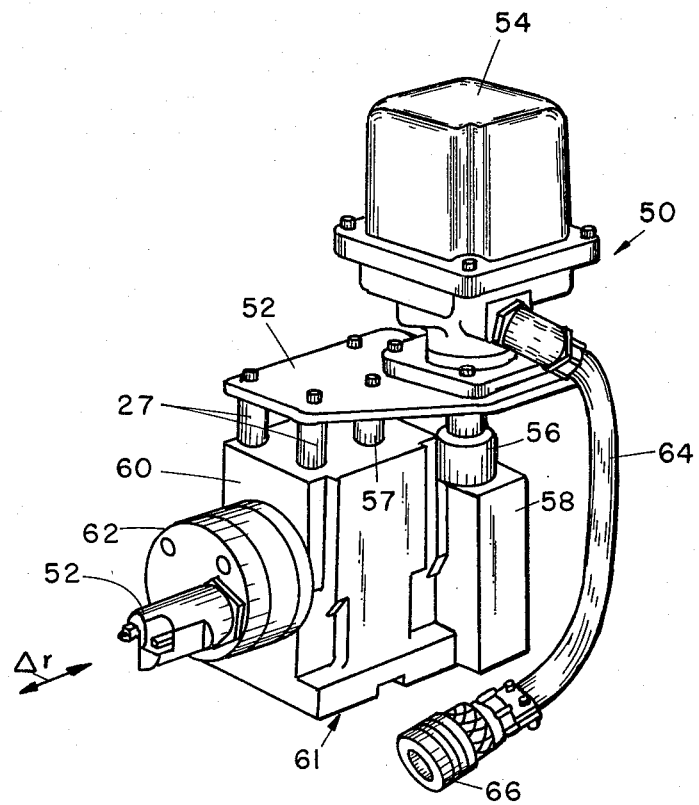
FIG. 2 is a perspective view of an adjustable tool block employed in connection with the present invention.

In the preferred embodiment of the invention, illustrated in FIG. 1, the tool compensating mechanism includes the compensating tool block 50 shown in FIG. 2 which is fixedly secured to the tool head of the boring machine 40 shown in FIG. 1. The detailed construction of the compensating tool block 50 is described in U.S. Pat. No. 3,654,826, issued Apr. 11, 1972, to R. C. Gersch, the disclosure of which is incorporated herein by reference. Other similar tool compensating tool blocks could be used with this invention. A brief description of the tool block 50 which provides controllable means for moving a machine tool 52 is, however, presented here.

The compensating tool block 50 includes a synchronous motor 54 having a drive shaft 56 coupled to the shaft of a drive head 58. The drive head is coupled to housing 60 to which motor 54 is also secured by means of mounting plate 55 and spacer posts 57. Head 58 and housing 60 contain gear means including an eccentric bushing for providing precise axial movement of a cutting tool 52 detachably mounted to the nose piece 62 of the assembly. The movement of the cutting tool is in an axial direction as indicated by the arrow $\Delta r$ in FIG. 2. This movement can be controlled to approximately 0.0001 inches by controlling motor 54 through control cable 64 having a connector 66 coupling it to the control circuit 20 shown in FIG. 1. Housing 60 includes a base 61 which is suitably secured to the tool head by means of conventional fastening means.

Figure 3:
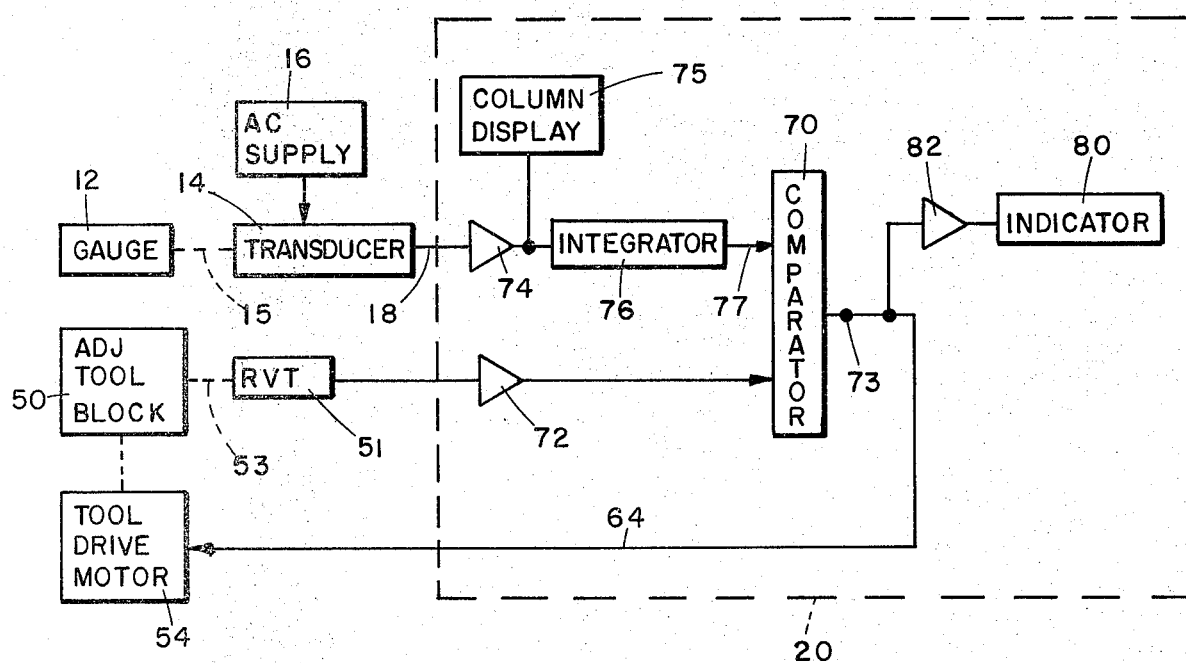
FIG. 3 is an electrical circuit diagram partly in schematic and block form of the present invention.
Figure 4:
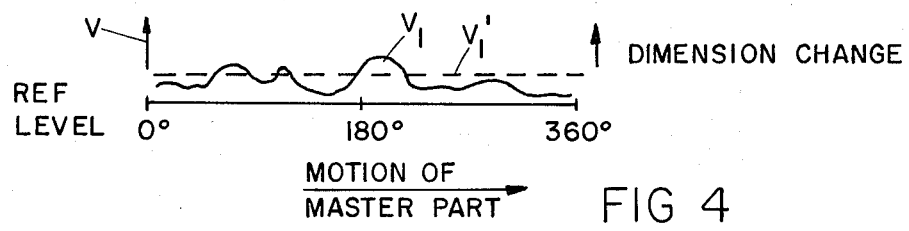
FIG. 4 is a voltage vave form diagram of control signals developed in the control circuit of the present invention.

Referring now to FIG. 3, the adjustable tool block 50 includes a resistive voltage transformer (RVT) 51 mechanically coupled thereto in a conventional means illustrated schematically as 53 in the FIG. The RVT 51 provides varying direct voltage output signals applied to a one input of comparator 70 by means of an amplifier 72. Similarly, the output control signal from the transducer 14 is applied to the other input of comparator 70 by means of amplifier 74 and an integrator circuit 76. Amplifier 74 is part of an integral column display 75 and amplifier circuit which is commercially available as Model No. 1802 from Emtron Controls, Inc. The output signal from amplifier 74 is represented as voltage $V_1$ in FIG. 4 and varies from a reference voltage (which may be zero) in a manner directly related to the dimension changes of the master part being gauged. The integrator 76 comprises a standard RC circuit and operational amplifier enabled for a cycle for providing an output signal $V_1$ (FIG. 4) representative of the average analog voltage supplied to its input from amplifier 74.

The signal from RVT 51 is also applied to the analog comparator 70 and is representative of the position of the workpiece 52 mounted to the adjustable tool block 50. If the actual and desired position of the tool 52 varies from the dimension of the master part as represented by signal $V_1'$ from the integrator 76, an error output signal is generated at terminal 73 of comparator 70 and is employed as an input drive signal to the tool drive motor 54. The output error signal at terminal 73 is also applied to an indicator lamp 80 by means of a lamp driver amplifier 82 thereby indicating to the operator that a dimension error correction is being made. The tool drive motor 54 moves the cutter 52 in response to the error integral as conductor 64 causing the output signal from the RVT 51 to change until the voltage from amplifier 72 corresponds to the output voltage $V_1'$ until the error output voltage at terminal 73 returns to zero. The motor 54 then is deactuated. The combined electrical and mechanical feedback loop thus assures correct position of the cutting tool 52 to reproduce the master part.

Figure 5:
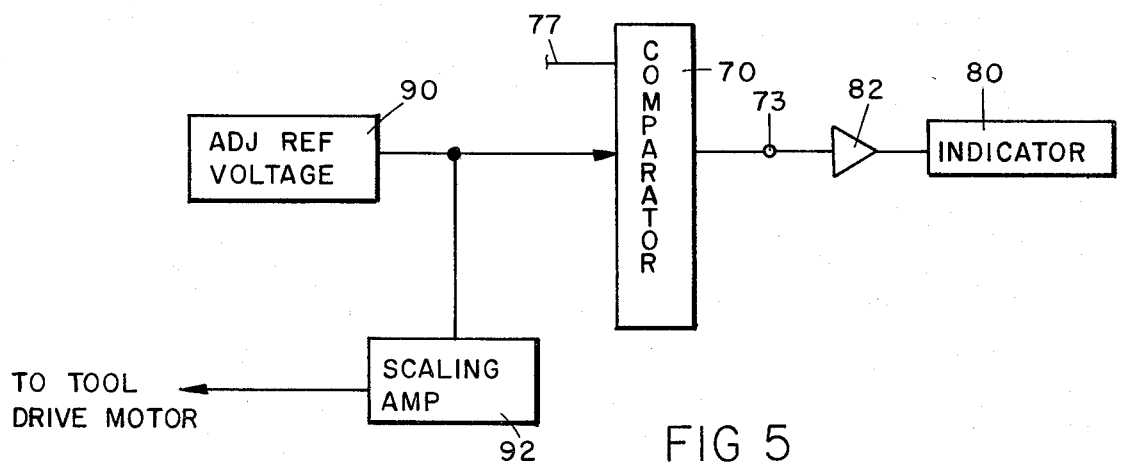
FIG. 5 is an electrical circuit diagram in block form of an alternative embodiment of the invention.

In place of employing the transducer RVT 51 associated with the adjustable tool block 50, an incremental reference voltage source providing varying output signals representative of increments of tool movement could be provided whereby the reference voltage source is employed in place of RVT 51 and amplifier 72 as one input of comparator 70. Such an arrangement is shown in FIG. 5. In FIG. 5, an adjustable reference voltage source 90 includes an adjustment knob (not shown) which is manually adjusted by the operator to extinguish indicator lamp 80 when an error voltage is present. This is achieved by adjusting the output voltage from source 90 until it reaches that of the output of integrator 76. The output terminal 73 of comparator 70 in this embodiment is thus coupled to the lamp driver 82. The output of reference voltage source 90 is also coupled to a scaling amplifier 92 to assure that each increment of the reference voltage source adjustment corresponds to a predetermined incremental motion of the adjustable tool (for example, 0.0001 inches) to control the position of the tool 52. Amplifier 92, thus has an adjustable gain and DC offset to calibrate the system. In both embodiments, a signal representing the actual dimension of a master part is compared with a signal representative of the position of the cutting tool attached to the adjustable tool block and the machine tool is moved until correspondence is reached.

In operation, a master part is positioned in the tool holder for the gauge 12 and a workpiece is positioned in the machine tool 40. The master part is then moved through a cycle for providing output voltage $V_1$ from the transducer and an average output $V_1'$ from the integrator 76. This signal is compared with the position of the cutting tool 52 either by a signal from RVT 51 or the reference signal from source 90 until correspondence of position of the machine tool is indicated by the extinguishing of indicator light 80. The cutting tool 52 is then in the desired working position. The machining tool 40 is then actuated to advance the workpiece into the cutting tool for boring, turning, or other machining operations on the workpiece.

It will become apparent to those skilled in the art that various modifications to the preferred embodiments of the invention described and disclosed herein can be made without departing from the spirit or scope thereof as defined by the appended claims.

The embodiments of the invention in which an exclusive property or privilege is claimed are defined as follows:

1. A machine tool control system for performing a machining operation on a workpiece to duplicate a master part comprising:
   a gauge including transducer means providing output signals representing the dimension of a master part;
   an adjustable tool block having a machine tool mounted thereto for adjustment by said tool block for positioning a machine tool with respect to a workpiece;
   a source of electrical signals representing the position of said machine tool;
   comparator means for comparing signals from said transducer means and from said source of signals for providing and error output signal when the position of the machine tool is different than that required to duplicate said master part;
   indicator means coupled to said comparator means for indicating the existence of said error signal;
   means for controlling said adjustable tool block to move said machine tool to a position for duplicating said master part when the error signal is indicated; and
   an integrator coupling said transducer to said comparator to provide an average level signal to said comparator such that said machine tool is adjusted for the average dimension of the master part.

2. The system as defined in claim 1 wherein said source of signals representative of the position of said machine tool comprises an adjustable reference voltage source.

3. The system as defined in claim 2 wherein said means for controlling said adjustable tool block includes electrically actuated drive means and wherein said adjustable reference voltage source is coupled to said drive means for controlling the position of said machine tool.

4. The system as defined in claim 3 and further including means coupled between said adjustable reference voltage source and said drive means for calibrating the system.

5. The system as defined in claim 4 wherein said indicator means comprises an indicator lamp.

6. A machine tool control system for performing a machining operation on a workpiece to duplicate a master part comprising:
   a gauge including transducer means for providing output signals representing the dimension of a master part;
   an adjustable tool block having means for mounting a machine tool thereto and including an electrical motor for adjustably moving a machine tool mounted to said block with respect to a workpiece;
   a source of electrical signals representing the position of a machine tool mounted to said block with respect to a workpiece;
   comparator circuit means coupled to said transducer means and to said source of electrical signals for comparing signals from said transducer means and from said source of signals to provide an output signal when the position of the machine tool is different than that required to duplicate said master part;

indicator means coupled to said comparator means for indicating when the machine tool is not positioned to duplicate the master part;

means for coupling said source of signals to said electrical motor to move said machine tool to a position with respect to a workpiece for duplicating said master part; and an integrator coupling said transducer to said comparator to provide an average level signal to said comparator such that said machine tool is adjusted for the average dimension of the master part.

7. The system as defined in claim 6 wherein said source of electrical signals representative of the position of said machine tool comprises an adjustable reference voltage source.

8. The system as defined in claim 7 wherein said means for coupling said source of signals to said electrical motor comprises a scaling amplifier.

9. The system as defined in claim 8 wherein said indicator means comprises an indicator lamp.

* * * * *